US012576376B2

(12) United States Patent (10) Patent No.: US 12,576,376 B2

Casalini et al. (45) Date of Patent: Mar. 17, 2026

(54) COATING COMPOSITION SCALE NETWORK DEVICE

(71) Applicant: PPG Industries Ohio, Inc., Cleveland, OH (US)

(72) Inventors: Giuseppe Casalini, Milan (IT); Geoffrey B. Anderson, New South Wales (AU)

(73) Assignee: PPG Industries Ohio, Inc., Cleveland, OH (US)

( * ) Notice: Subject to any disclaimer, the term of this patent is extended or adjusted under 35 U.S.C. 154(b) by 581 days.

(21) Appl. No.: 17/757,156

(22) PCT Filed: Jun. 17, 2021

(86) PCT No.: PCT/US2021/037724

§ 371 (c)(1),
(2) Date: Jun. 10, 2022

(87) PCT Pub. No.: WO2021/257763

PCT Pub. Date: Dec. 23, 2021

(65) Prior Publication Data

US 2022/0410098 A1 Dec. 29, 2022

Related U.S. Application Data

(60) Provisional application No. 63/040,774, filed on Jun. 18, 2020.

(51) Int. Cl.
B01F 33/84 (2022.01)
B01F 35/21 (2022.01)
(Continued)

(52) U.S. Cl.
CPC ...... B01F 33/8442 (2022.01); B01F 35/2115 (2022.01); B01F 35/2117 (2022.01);
(Continued)

(58) Field of Classification Search
CPC .............. B01F 33/8442; B01F 35/2115; B01F 35/2117; B01F 35/2135; B01F 2101/30;
(Continued)

(56) References Cited

U.S. PATENT DOCUMENTS 9,902,115 B1 2/2018 Janson et al.
2001/0050030 A1 12/2001 Friel et al.
(Continued)

FOREIGN PATENT DOCUMENTS

CN 201600592 U 10/2010
CN 205965643 U 2/2017
(Continued)

OTHER PUBLICATIONS

Office Action received for Australia Patent Application No. 2021292219, mailed on Jun. 20, 2023, 4 pages.
(Continued)

*Primary Examiner* — Lee E Rodak
*Assistant Examiner* — Byung Ro Lee

(57) ABSTRACT

A coating composition system for weighing and formulating coating compositions comprises a physical enclosure enclosing an electronic coating composition networking device. The electronic coating composition networking device comprises a local communication interface configured to receive a physical connector from an electronic scale and a network communication interface configured to communicate with an internet gateway. Additionally, at least one sensor may be integrated within the electronic coating composition networking device. The electronic coating composition networking device also receives, through the local communication interface, a mass variable from the electronic scale and a sensor variable from the at least one sensor. The electronic coating composition networking device then generates a network data structure comprising
(Continued)

the sensor variable and the mass variable. The electronic coating composition networking device communicates, through the internet gateway, the network data structure to a remote server.

18 Claims, 5 Drawing Sheets

(51) Int. Cl.
*B01F 101/30* (2022.01)
*G01G 19/38* (2006.01)
*G01G 23/37* (2006.01)

(52) U.S. Cl.
CPC ....... *B01F 35/2135* (2022.01); *G01G 19/382* (2013.01); *G01G 23/3735* (2013.01); *B01F 2101/30* (2022.01)

(58) Field of Classification Search
CPC ... G01G 19/382; G01G 23/3735; G06Q 10/08
See application file for complete search history.

(56) References Cited

U.S. PATENT DOCUMENTS

| | | | |
|---|---|---|---|
| 2002/0089513 A1 | 7/2002 | Blanchard et al. | |
| 2002/0138294 A1 | 9/2002 | Ando et al. | |
| 2003/0019537 A1 | 1/2003 | Taylor et al. | |
| 2004/0133306 A1 | 7/2004 | Schmid | |
| 2006/0031027 A1 | 2/2006 | Alman | |
| 2007/0032965 A1 | 2/2007 | Mcclanahan et al. | |
| 2008/0147348 A1* | 6/2008 | Lewis | G01J 3/02 |
| | | | 702/127 |
| 2008/0235224 A1 | 9/2008 | Joseph Rodrigues et al. | |
| 2008/0249716 A1 | 10/2008 | Huang | |
| 2009/0125318 A1 | 5/2009 | Eilenberger et al. | |
| 2009/0228143 A1 | 9/2009 | Hughes et al. | |
| 2011/0148218 A1 | 6/2011 | Rozbicki | |
| 2012/0170836 A1 | 7/2012 | Henry et al. | |
| 2012/0189762 A1 | 7/2012 | Reineccius et al. | |
| 2012/0219699 A1 | 8/2012 | Pettersson et al. | |
| 2013/0071015 A1 | 3/2013 | Rodrigues et al. | |
| 2013/0113715 A1 | 5/2013 | Grant et al. | |
| 2014/0017392 A1* | 1/2014 | Lewis | B05C 9/14 |
| | | | 118/712 |
| 2015/0116346 A1 | 4/2015 | Ceglarek et al. | |
| 2016/0239003 A1 | 8/2016 | Bierie et al. | |
| 2017/0132801 A1 | 5/2017 | Trenholm et al. | |
| 2017/0347476 A1 | 11/2017 | Hwang et al. | |
| 2018/0158124 A1 | 6/2018 | Caruso et al. | |
| 2019/0241011 A1 | 8/2019 | Marsala et al. | |
| 2019/0332254 A1 | 10/2019 | Norris et al. | |
| 2020/0168059 A1 | 5/2020 | Lafrance | |

FOREIGN PATENT DOCUMENTS

| | | | |
|---|---|---|---|
| CN | 106548497 A | 3/2017 |
| CN | 206133269 U | 4/2017 |
| CN | 107457124 A | 12/2017 |
| CN | 107803102 A | 3/2018 |
| CN | 107930949 A | 4/2018 |
| CN | 108173392 A | 6/2018 |
| CN | 108265957 A | 7/2018 |
| CN | 108332796 A | 7/2018 |
| CN | 108335251 A | 7/2018 |
| CN | 108362339 A | 8/2018 |
| CN | 108398158 A | 8/2018 |
| CN | 108555730 A | 9/2018 |
| CN | 108878079 A | 11/2018 |
| CN | 109814643 A | 5/2019 |
| CN | 208922435 U | 5/2019 |
| CN | 209576378 U | 11/2019 |
| CN | 111318091 A | 6/2020 |
| EP | 1238249 A1 | 9/2002 |
| GB | 201819222 | 1/2019 |
| IN | 992/MUM/2010 A | 3/2011 |
| JP | 2002-236850 A | 8/2002 |
| KR | 10-2049699 B1 | 11/2019 |
| WO | 01/44767 A1 | 6/2001 |
| WO | 2006/052561 A2 | 5/2006 |
| WO | 2008/045352 A1 | 4/2008 |
| WO | 2008/045418 A1 | 4/2008 |
| WO | 2016/172316 A1 | 10/2016 |
| WO | 2018/184959 A1 | 10/2018 |
| WO | 2019/101803 A1 | 5/2019 |

OTHER PUBLICATIONS

"Advances in Intelligent Systems and Computing", 1st International Conference on Computer Science, Electronics and Industrial Engineering, CSEI 2019, Retrieved at https://www.scopus.com/inward/record.uri?eid=2-s2.0-85076210261&partnerID=40&md5=ea0c95417797a128f4e6f1f699ec5038, vol. 1078, 353 pages.

Al-Masri, E., et al., "A Serverless IoT Architecture for Smart Waste Management Systems", Proceedings—2018 IEEE International Conference on Industrial Internet, ICII 2018, pp. 179-180.

Kumar, R., et al., "Self Operating Paint Bot", ICDCS 2020—2020 5th International Conference on Devices, Circuits and Systems, 2020, pp. 211-214.

Lin, Y-B., et al., "HomeTalk: A Smart Home Platform", Lecture Notes of the Institute for Computer Sciences, Social-Informatics and Telecommunications Engineering, LNICST, 2020. pp. 107-122.

Ma, G., et al., "Design of Energy Refinement Management System for Agricultural Machinery Painting Based on Internet of Things", Journal of Physics: Conference Series, vol. 1314, 2019, 10 Pages.

Pinto, R., et al., "A discussion about the implementation of a WSN to industry 4.0 based on the IEEE 1451 standard", IEEE International Conference on Industrial Informatics (INDIN), vol. 2019—July, Jul. 2019, Article No. 8972222, pp. 1573-1578.

Shen, Z., et al., "Dynamic Production Scheduling Modeling and Multi-objective Optimization for Automobile Mixed-Model Production", Communications in Computer and Information Science, vol. 924, 2018, pp. 25-33.

Wi, D.H., et al., "Opportunistic and location-based collaboration architecture among mobile assets and fixed manufacturing processes", Sensors (Switzerland), vol. 18, Aug. 17, 2018, 13 Pages.

Zhang, K., et al., "IoT-enabled dynamic lean control mechanism for typical production systems", Journal of Ambient Intelligence and Humanized Computing, vol. 10, 15 pages.

International Search Report and Written Opinion received for PCT Application Serial No. PCT/US2021/037724 dated Sep. 29, 2021, 8 pages.

\* cited by examiner

350

COATING COMPOSITION SCALE NETWORK DEVICE

CROSS-REFERENCE TO RELATED APPLICATIONS

This application claims the benefit of and priority to U.S. Provisional Patent Application Ser. No. 63/040,774 filed on 18 Jun. 2020 and entitled "COATING COMPOSITION SCALE NETWORK DEVICE," which application is expressly incorporated herein by reference in its entirety.

BACKGROUND OF THE INVENTION

1. Technical Field

The present invention relates to devices, computer-implemented methods, and systems for formulating coating compositions using a network device.

2. Background and Relevant Art

Modern coatings provide several important functions in industry and society. Coatings can protect a substrate from corrosion, such as rust. Coatings can also provide aesthetic or decorative properties by providing a particular color and/or spatial appearance to an object. For example, most automobiles are coated using paints and various other coatings in order to protect the metal body of the automobile from the elements and also to provide aesthetic visual effects.

In view of the wide-ranging uses for different coatings, it is often necessary to repair coated surfaces or to create a new coating for a surface. For instance, it might be necessary to repaint a damaged portion of a car. In conventional settings, this coating creation process is performed using scales and measuring units to assist in mixing the right proportions of components in order to generate the desired coating. These conventional measuring steps introduce significant room for error. Technological innovations disclosed herein may provide assistance in this otherwise challenging task.

BRIEF SUMMARY OF THE INVENTION

The present invention comprises a coating composition system for weighing and formulating coating compositions. The coating composition system comprises a physical enclosure enclosing an electronic coating composition networking device. The electronic coating composition networking device also comprises a local communication interface configured to receive a physical connector from an electronic scale. The electronic scale comprises a separate device that is external to the physical enclosure of the electronic coating composition networking device. The electronic coating composition networking device further comprises a network communication interface configured to communicate with an internet gateway. Additionally, at least one sensor is integrated within the electronic coating composition networking device.

The electronic coating composition networking device also comprises one or more processors configured to process data received from the electronic scale and at least one sensor. The electronic networking scale device further comprises a first computer-readable media having stored thereon executable instructions that when executed by the one or more processors configure the electronic coating composition networking device to perform various acts. In particular, the coating composition system can perform the methods for weighing and formulating coating compositions as described herein. The acts include the electronic coating composition networking device receiving, through the local communication interface, a mass variable from the electronic scale. The mass variable provides a mass of a coating mixture resting on the electronic scale. The electronic coating composition networking device also receives, from the at least one sensor, a sensor variable. The sensor variable provides data describing an aspect of a physical environment around the coating mixture. The electronic coating composition networking device then generates a network data structure comprising the sensor variable and the mass variable. The electronic coating composition networking device communicates, through the internet gateway, the network data structure to a remote server.

The present invention also comprises a method for weighing and formulating coating compositions. The method is executed on one or more processors and comprises receiving at an electronic coating composition networking device, through a local communication interface, a mass variable from an electronic scale. In particular, the method can be performed on coating composition systems for weighing and formulating coating compositions described herein. The mass variable provides a mass of a coating mixture resting on the electronic scale. The local communication interface is configured to receive a physical connector from the electronic scale. The electronic scale comprises a separate device that is external to a physical enclosure that encloses the electronic coating composition networking device. The method also comprises receiving, from at least one sensor, a sensor variable. The sensor variable provides data describing an aspect of a physical environment around the coating mixture, and at least one sensor is integrated within the electronic coating composition networking device. Additionally, the method comprises generating a network data structure comprising the sensor variable and the mass variable. Further, the method comprises communicating from the electronic coating composition networking device, through an internet gateway, the network data structure, to a remote server.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore considered to be limiting of its scope, the invention will be described and explained with additional specificity and detail through the use of the accompanying drawings in which.

DETAILED DESCRIPTION

Figure 1:
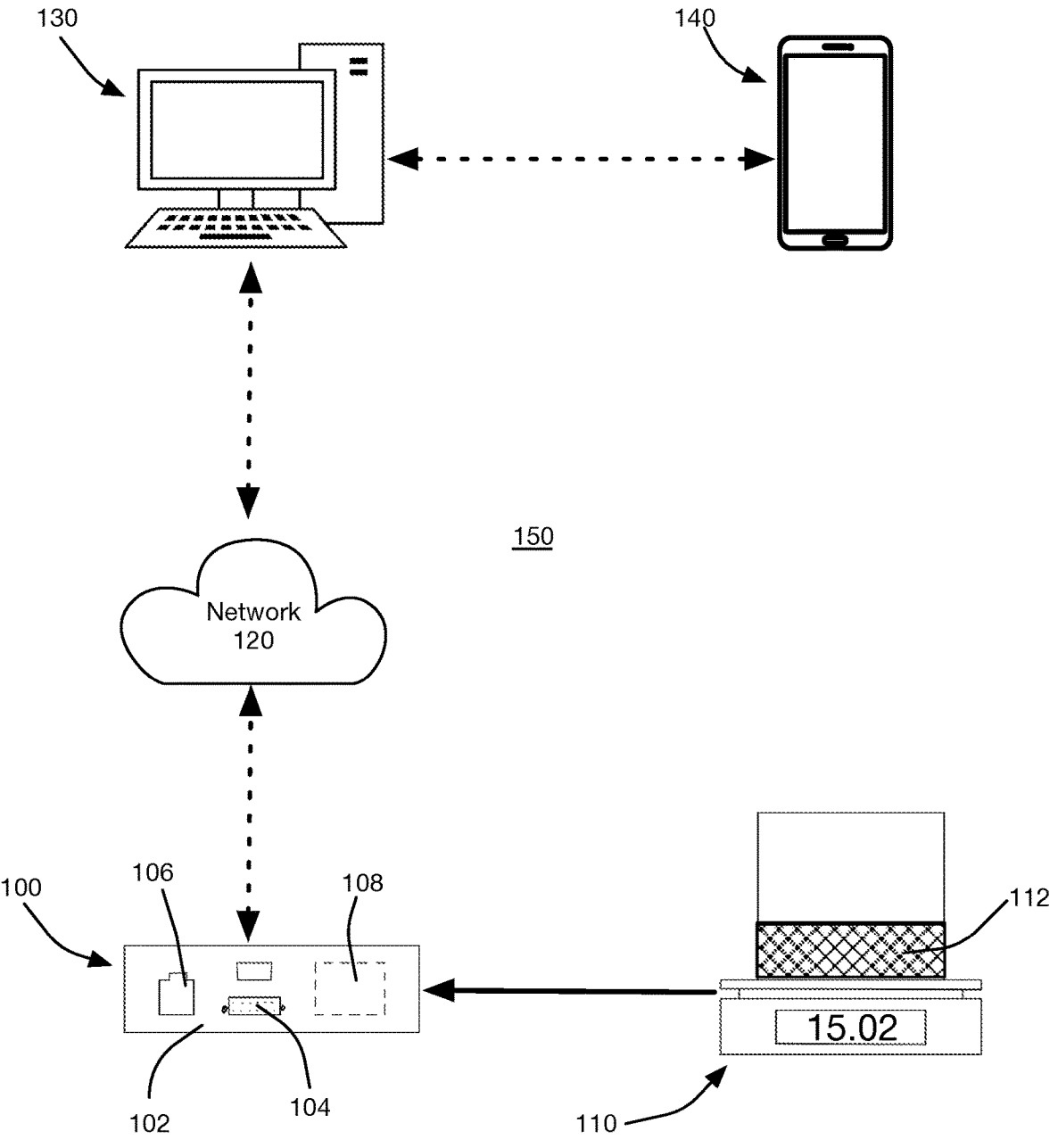
FIG. 1 depicts a schematic diagram of a coating composition system that comprises an electronic coating composition networking device, an electronic scale, a remote server, and a local computing device.

The present invention extends to systems, devices, and methods for weighing and formulating coating compositions. The coating composition system provides dynamic processing and intelligent coating formulation services to conventional devices. The system can retrofit older non-networkable devices in order to provide computer-aided formulation services that would not otherwise be possible on the old devices. Additionally, disclosed systems provide environmental insights into the coating components through the use of sensors that are integrated within the coating composition system.

As previously described, the present coating composition system comprises, in part, an electronic coating composition networking device. As used herein, an "electronic coating composition network devices" refers to a network-connected electronic device that, among other things, communicates data, such as sensor variables, to a remote server for processing with coating composition software. For example, an electronic coating composition networking device may receive electronic communications from an electronic scale. In particular, the electronic coating composition networking device may be in communication with the electronic communications from an electronic scale. When in use, the electronic scale is typically positioned within a coating facility that uses the scale to measure the desired amounts of components needed to create a target coating composition. As used herein, coating compositions may include a resinous binder and/or a plasticizer, and optionally other additives, such as colorants. A suitable resinous binder comprises one or more film-forming resins that can be used to form a coating layer such as a thermoset or thermoplastic. By "colorant" it is meant to include pigments (organic or inorganic) that impart color, a hiding pigment (e.g. $TiO_2$), and/or color effect materials (e.g. metal flakes). The composition may include any other components that are typically provided in coatings, stains, paints, or the like (such as those used by the automotive, industrial, marine, architectural or aerospace industries), and any other coating that is applied to a physical surface. For example, a coating formulation may require the addition of one kilogram of a first component, half a kilogram of a second component, and one-and-a-half kilograms of a third component. A user uses the electronic scale to measure the individual components and mix them together. In some situations, the components may be mixed consecutively such that a container remains on the electronic scale while each component is added to the container. The coating composition system monitors the cumulative mass of the container to ensure that the correct amount of each component is added.

The electronic coating composition networking device is also able to communicate through a network communication interface. The network communication interface is configured to communicate through an internet gateway for to a remote server that comprises a coating database. The coating database comprises formulations, and optionally other data, for a number of different coatings. The remote server, in turn, communicates instructions to a local computing device that guides the user through the coating formulation process.

The electronic coating composition networking device may also comprise integrated sensors, such as but not limited to a temperature sensor and/or a humidity sensor. The electronic coating composition networking device may be positioned near the electronic scale such that the sensors detect environmental characteristics that directly describe the environment around the electronic scale and the coating mixture resting on the electronic scale. The electronic coating composition networking device communicates the sensor data to a remote server for further processing. In some cases, environmental characteristics impact how a particular coating should be formulated. For example, an area with high heat may require different components and/or different amounts of components in order to properly create a target coating composition. Similarly, other environment characteristics, such as but not limited to humidity, pressure, and dew point, may impact the formulation of a target coating composition.

To address these differences in formulation, the remote server comprises formulas and data tables that indicate appropriate changes that should be made to a given target coating based upon various environmental characteristics. These "changes" may include differences in component masses, differences in components added to a composition mixture, and various other changes to a formulation for a particular target coating. Using this information, the remote server can dynamically communicate proper instructions, given the environment characteristics, to the user's computing device. For example, the humidity sensor may gather a sensor variable that indicates an eighty-percent humidity level. Based upon this sensor variable, the remote server may identify a specific mass of a component that is needed in view of that humidity. Additionally or alternatively, the remote server may identify a particular component that has to be added to the coating mixture because of the humidity level, whereas, at lower humidity levels the particular component would not be included in the coating mixture.

Turning now to the figures, FIG. 1 depicts a schematic diagram of a coating composition system 150 that comprises an electronic coating composition networking device 100, an electronic scale 110, a remote server 130, and a local computing device 140. The electronic coating composition networking device 100 comprises a physical enclosure 102 enclosing the electronic coating composition networking device 100. Placing the components of the electronic coating composition networking device 100 within the physical enclosure allows the components to operate within an environment where painting spray may otherwise interfere with the electronics. As depicted, the electronic scale 110 is a separate device that is external to the physical enclosure 102. This separation allows the electronic scale 110 to be retrofit with the electronic coating composition networking device 100 such that the electronic scale 110 gains potentially new features provided by the electronic coating composition networking device 100.

The electronic coating composition networking device 100 comprises a local communication interface 104 configured to receive a physical connector from the electronic scale 110. In the depicted example, the local communication interface 104 comprises a serial port, but one will appreciate that any number of different types of local communication interfaces 104 may be used. For example, the local communication interface 104 may comprise a universal serial bus (USB), a parallel port, a SPI port, or any other type of physical port.

In various examples, the electronic scale 110 may comprise either an analog scale or a digital scale. Further in various examples, the electronic scale 110 lacks a hardware network interface, such that the electronic scale 110 is not equipped with the necessary hardware and/or software to communicate over a network connection. As such, in some examples, the electronic scale 110 is only able to communicate with the remote server 130 through the electronic coating composition networking device 100.

The electronic coating composition networking device 100 also comprises a network communication interface 106 configured to communicate with an internet gateway. The network communication interface 106 is depicted as an Ethernet port, but may comprise any connection capable of network communications including, but not limited to, a WIFI network interface or a BLUETOOTH network interface. The internet gateway may comprise a router, a modem, or any other conventional network gateway device. The electronic coating composition networking device 100 communicates with a network 120 through the internet gateway.

Figure 2:
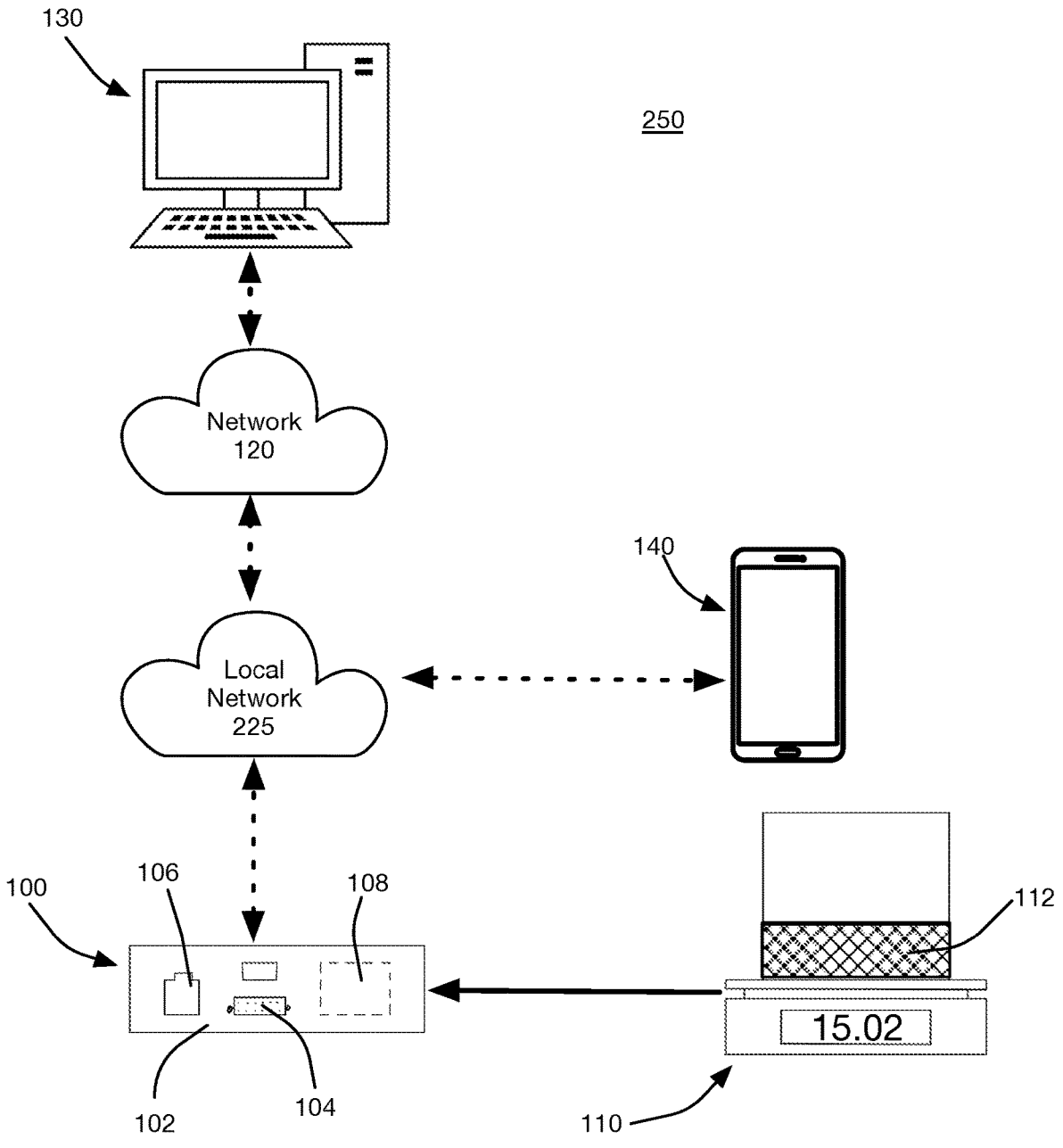
FIG. 2 depicts a schematic diagram of another coating composition system that comprises an electronic coating composition networking device, an electronic scale, a remote server, and a local computing device.

As an additional or alternative configuration, FIG. 2 depicts a schematic diagram of another coating composition system 250 that comprises an electronic coating composition networking device 100, an electronic scale 110, a remote server 130, and a local computing device 140. In contrast to the coating composition system 150 of FIG. 1, FIG. 2 makes clear that the computing device 140 may also communicate with the electronic coating composition networking device 100 directly through the local area network 225. As such, the computing device 140 may be configured to communicate through an external network 120 and/or a local network 225.

Figure 3:
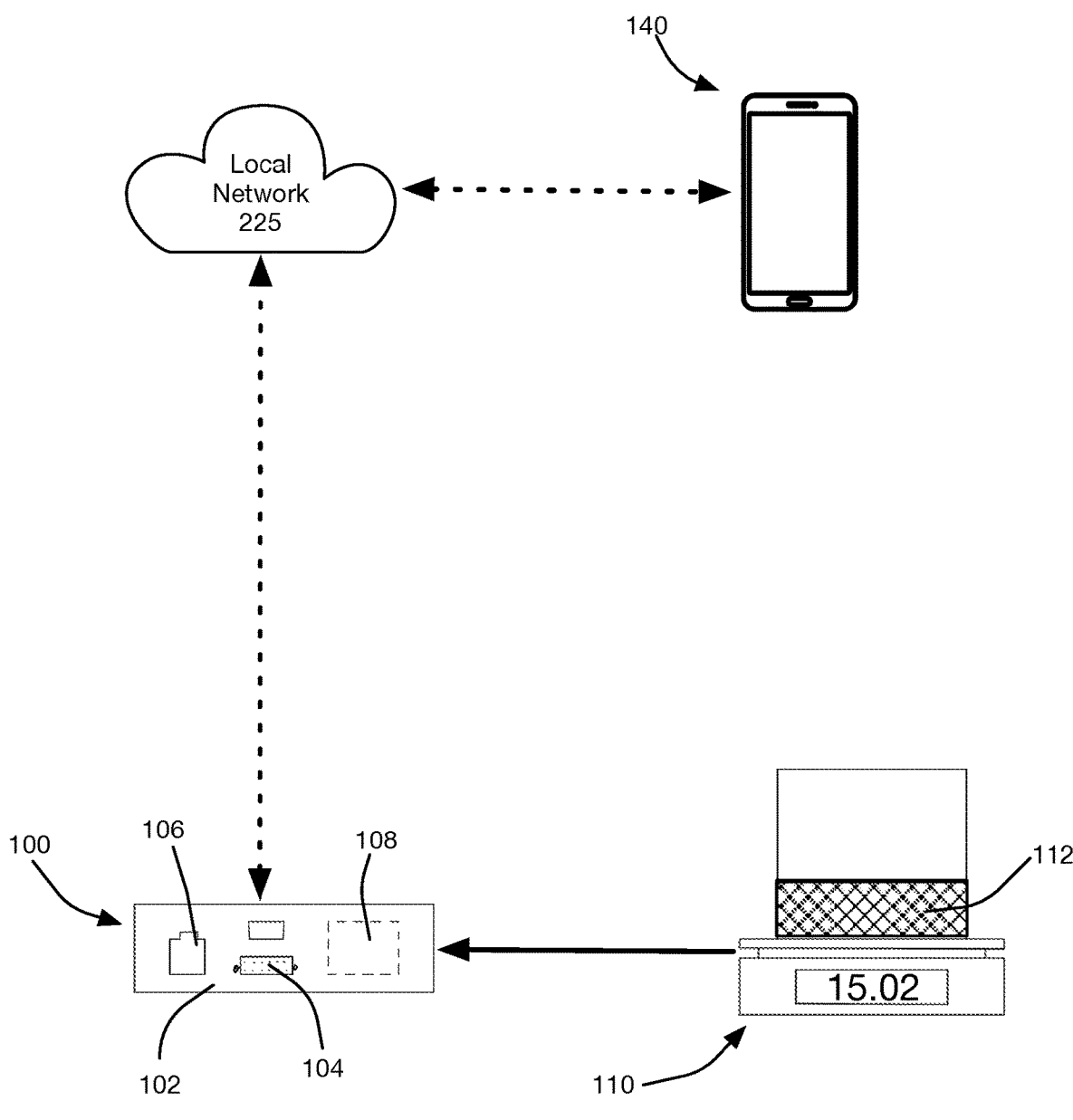
FIG. 3 depicts a schematic diagram of yet another coating composition system that comprises an electronic coating composition networking device, an electronic scale, and a local computing device.

FIG. 3 depicts a schematic diagram of yet another coating composition system 350 that comprises an electronic coating composition networking device 100, an electronic scale 110, and a local computing device 140. In contrast to the coating composition system 150 of FIG. 1 and the coating composition system 250 of FIG. 2, coating composition system 350 does not depict a separate remote server 140. In this depicted embodiment, the computing device 140 performs all necessary computational and data accessing steps. As such, the "remote server 130" may be wholly integrated within the computing device 140. Accordingly, as used herein, when an act is described as being performed by the remote server 130, the act may additionally or alternatively be performed by the computing device 140. As such, the computing device 140 and remote server 130 may comprise a single device or separate devices and still function as described herein.

Figure 4:
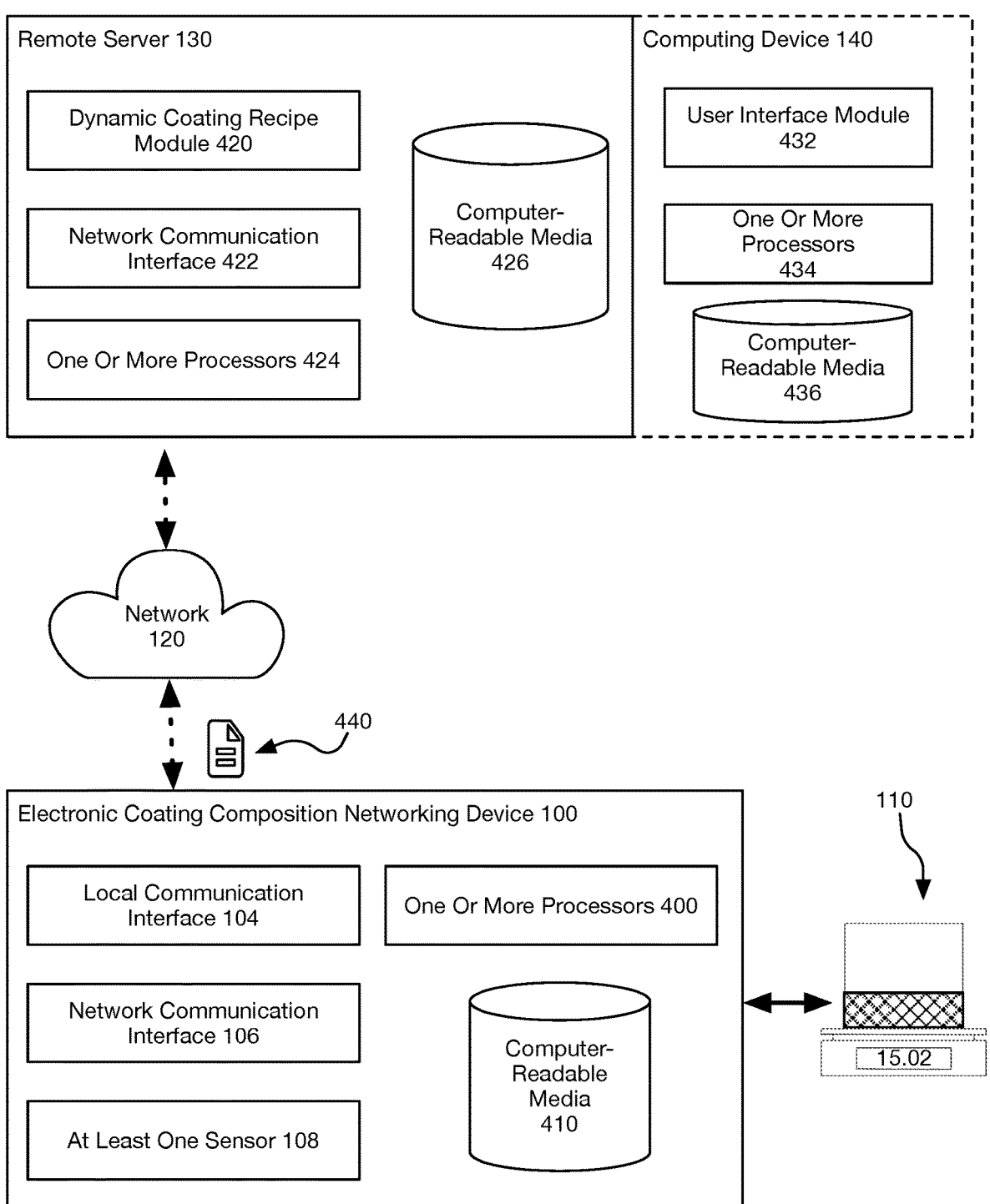
FIG. 4 depicts a schematic diagram of software and/or hardware components within an electronic coating composition networking device, a remote server, and a local computing device.

Turning now to FIG. 4, FIG. 4 depicts a schematic diagram of software and/or hardware modules within an electronic coating composition networking device 100, a remote server, 130 and a computing device 140. As depicted, the electronic coating composition networking device 100 comprises a local communication interface 104, a network communication interface 106, at least one sensor 108, one or more processors 400, and first computer-readable media 410. The remote server 130 comprises a dynamic coating recipe module 420, a network communication interface 422, one or more processors 424, and second computer-readable media 426. The computing device 140 comprises a user interface module 432, one or more processors 434, and a third computer-readable memory 436. The computing device 140 is shown in dashed lines connected to the remote server 130 to indicate, as described above with respect to FIG. 3, that the remote server 130 and the computing device 140 may be the same physical device.

As used herein, a "module" comprises computer executable code and/or computer hardware that performs a particular function. One of skill in the art will appreciate that the distinction between different modules is at least in part arbitrary and that modules may be otherwise combined and divided and still remain within the scope of the present disclosure. As such, the description of a component as being a "module" is provided only for the sake of clarity and explanation and should not be interpreted to indicate that any particular structure of computer executable code and/or computer hardware is required, unless expressly stated otherwise. In this description, the terms "component", "agent", "manager", "service", "engine", "virtual machine" or the like may also similarly be used.

Returning now to the depicted systems 150, 250, 350, the electronic coating composition networking device 100 also comprises at least one sensor 108 integrated within the electronic coating composition networking device 100. In FIGS. 1-3, the at least one sensor 108 is shown with dashed lines to indicate that the sensor may be visible on the electronic coating composition networking device 100 or that it may be integrated within the physical enclosure 102. The at least one sensor may comprise one or more of a temperature sensor, a humidity sensor, a pressure sensor, an altimeter, a location-detection antenna (e.g., a GPS radio), or any other sensor capable of providing data describing an aspect of a physical environment around the coating mixture 112. Additionally, in some examples, the at least one sensor comprises an interchangeable hardware slot that is configured to receive a plurality of different sensor types. Accordingly, the at least one sensor 108 is modular such that different sensors and different types of sensors can be added or removed from the electronic coating composition networking device 100.

The electronic coating composition networking device 100 also includes one or more processors 400 configured to process data received from the electronic scale 110 and the at least one sensor 108. The electronic coating composition networking device 100 further includes a first computer-readable media 410 having stored thereon executable instructions that when executed by the one or more processors 400 configure the electronic coating composition networking device 100 to perform various acts. For example, the electronic coating composition networking device 100 receives, through the local communication interface 104, a mass variable from the electronic scale 110. The mass variable provides a mass of a coating mixture 112 resting on the electronic scale 110. The electronic coating composition networking device 100 also receives, from the at least one sensor 108, a sensor variable. The sensor variable provides data describing an aspect of a physical environment around the coating mixture 112. For example, the sensor variable may comprise an ambient temperature, a humidity level, an atmospheric pressure, an altitude, a geographic location (from the location-detection antenna or from an IP address localization), and/or any other data pertinent to the physical environment around the coating mixture 112. Accordingly, the sensor variable may provide a humidity reading from the physical environment around the coating mixture and a temperature reading from the physical environment around the coating mixture.

The electronic coating composition networking device 100 then generates a network data structure 440 comprising the sensor variable and the mass variable. The electronic coating composition networking device 100 communicates the network data structure 440 to a remote server 130. The remote server 130 receives the network data structure 440 from the electronic coating composition networking device 100. The remote server 130 comprises a second computer-readable media 426 having stored thereon executable instructions that when executed by the remote server configure one or more processors 424 at the remote server 130 to perform various acts.

The remote server 130 may then also receive an indication of a target coating formulation. As used herein the "target coating formulation" refers to a particular target coating that a user desires to create from a mixture of several components. For example, a target coating formulation may be a particular color and type of paint. The components may comprise pigments, binders, liquids, additives, and other similar constituent components of coatings. The coating mixture 112 may comprise at least one component of the target coating formulation. The remote server 130 may receive the indication of the target coating formulation from the computing device 140 such as a tablet, mobile phone, laptop, or desktop computer. As described above, in some cases, the computing device 140 and the remote server 130 comprise the same device, and as such, the indication of a target coating formulation may be received directly from a user. In other cases, however, the computing device 140 may be physically separate from the electronic coating composition networking device 100 and the remote server 130. In at least one embodiment, the target coating formulation may be communicated within the network data structure 440 that is generated by the electronic coating composition networking device 100.

After receiving the target coating formulation, a dynamic coating recipe module 420 at the remote server 130 accesses, from a coating database stored in the computer-readable media 426, a dynamic coating recipe. The dynamic coating recipe considers the mass of constituent components of the target coating formulation as a function of the data provided by the sensor variable. One of skill in the art will appreciate that environmental factors may impact the formulation of a particular coating. For example, the ambient temperature and/or humidity can impact the coating mixture such that the same ingredient mixed under different environmental conditions would result in different final coatings. To reduce or eliminate this difference in outcomes, the dynamic coating recipe module 420 is configured to adjust the dynamic coating recipe based upon the sensor variable. For example, the dynamic coating recipe may comprise an algorithm or a look-up table that indicates changes to the coating recipe based upon one or more environmental characteristics. In some cases, the changes may comprise entirely new or different components that are added to the coating mixture.

Using the dynamic coating recipe, the dynamic coating recipe module 420 identifies a particular component, selected from constituent components of the target coating formulation, to add to the coating mixture 112. The dynamic coating recipe module 420 then determines a particular mass of the particular component to add to the coating mixture based upon the mass variable and the sensor variable received from the electronic coating composition networking device 100. An aspect of a physical environment, as measured in the sensor variable, determines, at least in part, the particular mass of the particular component to add to the coating mixture.

In an additional example, the dynamic coating recipe module 420 may determine the particular mass based upon any number of different environment characteristics received in the sensor variable. The dynamic coating recipe module 420 may additionally or alternatively, determine the particular mass of the particular component to add to the coating mixture 112 based upon the mass variable associated with the current coating mixture 112, the sensor variable, and the geographic location of the coating mixture 112. For example, the dynamic coating recipe module 420 may utilize the geographic location to look-up environmental data related to the location of the coating mixture 112, such as current outdoor temperature, humidity, pressure, and other related environmental characteristics. Further, the dynamic coating recipe module 420 may utilize the geographic location to determine if there are regulatory restrictions on various components within a coating mixture 112. For example, in some jurisdictions, it may not be legal to use various coating types. As such, the dynamic coating recipe module 420 can access a database of jurisdictional regulations to determine if the requested coating formulation is illegal in the jurisdiction where the electronic coating composition networking device 100 is located. If it is determined to be illegal, the remote server 130 may send a notification to the user and/or prevent the computing device 140 from displaying the steps required to make the coating composition.

After a particular component is added to the coating mixture 112, the electronic coating composition networking device 100 may receive, through the local communication interface 104, an updated mass variable from the electronic scale 110. The updated mass variable provides an updated mass of the coating mixture 112 resting on the electronic scale 110 after the particular component has been added to the original coating mixture 112. The electronic coating composition networking device 100 generates an updated network data structure that comprises the updated mass variable. The electronic coating composition networking device 100 then communicates, through the internet gateway, the updated network data structure to the remote server 130.

The remote server 130 receives the updated network data structure from the electronic coating composition networking device 100. The dynamic coating recipe module 420 then verifies that the updated mass variable is equal to a sum of the particular mass and the mass variable that was previously received. In this way, the remote server is able to verify that the correct amount of the particular component was added to the coating mixture 112. In the case that the updated mass is below a lower threshold of the sum of the particular mass and the mass variable, the dynamic coating recipe module 420 can send a communication to the computing device 140 to cause a user interface module 432 to display an alert to the user that a specific amount of the particular component still needs to be added to the coating mixture 112.

In the case that the updated mass is above an upper threshold of the sum of the particular mass and the mass variable, the dynamic coating recipe module 420 can send a communication to the computing device 140 to cause the user interface module 432 to display an alert to the user that too much of the particular component was added to the coating mixture 112. The dynamic coating recipe module 420 can also send communications to the computing device 140 that indicate that specific amounts of the previously added components should be added again to the coating mixture 112. In this way, the coating mixture is not a loss, but instead the final amount of coating mixture 112 is just increased in order to properly proportion the amount of the particular component that was over added.

In view of the disclosure provided herein, one will appreciate the many improvements provided by and problems overcome by the disclosed systems and methods. Additional, non-limiting examples, of these improvements and benefits may comprise utilizing the temperature and humidity sensor to provide various novel and non-obvious outputs. For examples, during product and dilution ratio selection, the remote server 130 may identifying the best product and ratio considering the temperature and humidity as provided in the sensor variable. Similarly, the remote server 130 may use the sensor variables to calculate the best combination of intermediates to be mixed to create the final clears, primers, and in general all coating products.

In some examples, a user may be attempting to perform a particular task, such as repairing a specific spot of an automobile. Using the computing device 140, the user may send a request to the remote server 130 for a coating to fix the specific spot. The remote server 130 may then calculate the amount of coating needed to fix the specific spot. The dynamic coating recipe module 420 can then account for the environmental data provided by the sensor variable and provide the user with the proper measurements of components to add to the coating mixture 112 in order to create the desired coating in the desired amount. While the example of fixing a specific spot on an automobile is provided, other examples of the user providing a particular intent for a particular requested amount of coating may operate similarly.

Additionally, the dynamic coating recipe module 420 may identify that the sensor variable comprises data that is outside of a predetermined threshold for a particular constituent component of the target coating formulation. For example, a particular chemical may be associated with a predetermined threshold of a lowest temperature at which the particular chemical can be used. The dynamic coating recipe module 420 may identify that the sensor variable indicates that the temperature is below the predetermined threshold for the particular chemical. Based upon that information, the dynamic coating recipe module 420 communicates a command that causes the user interface module 432 within the computing device 140 that causes the computing device 140 to display a warning relating to the predetermined threshold for the particular constituent component of the target coating formulation. One of skill in the art will appreciate that different chemical components, or constituent parts of the coating mixture, may be associated with a number of different predetermined thresholds, such as, but not limited to, upper and lower temperature thresholds, humidity thresholds, atmospheric pressure thresholds, altitude thresholds, and other similar environmentally-driven limits.

Additionally or alternatively, some coating products are negatively affected by low temperature. Accordingly, the remote server 130 may monitor the temperature variable, within the sensor variable, to advise a user if the coating mixture 112 got too low in temperature (e.g., frozen). Similarly, the remote server 130 may monitor the temperature and humidity to advise a user if the temperate is too high or the humidity too low to use the coating mixture 112.

As additional examples relating to the use of the at least one sensor, the remote server 130 may be configured to recommend application techniques and time required between first and second coats of a coating composition. For example, the remote server 130 may determine, based upon the humidity and temperature provided by the sensor variable, how long it will take for a coating to dry in order to apply a second coat. This information may be useful for maximizing the painting of items, such as cars, while minimizing the dry time. Similarly, the electronic coating composition networking device 100 may be placed directly in a spray booth, such that the electronic coating composition networking device 100 can send an alert to the computing device 140 when the car is ready for the next coat. The alert may be based upon information relating to the coating composition, the temperature, and the humidity within the spray booth. As such, the remote server 130 may receive, from a second electronic coating composition networking device, a second variable description describing an aspect of a different physical environment around the coating mixture—such as the spray booth. The identification of the particular component and/or the determination of the particular mass of the particular component to be added to a coating composition may be additionally based on the second variable description.

The ability to combine the electronic coating composition networking device 100 from the electronic scale 110 and a spray booth provide significant benefit in that the dynamic coating recipes can compensate for both the environmental conditions present when creating the coating mixture 112 and the environmental conditions present within the spray booth where the coating is applied. For example, even after the coating composition 112 has been completed, the system may continue to provide valuable information based upon the sensor variables.

For instance, the remote server 130 may be configured to provide spray gun settings to a user based upon the particular coating composition, temperature readings, and humidity readings. For example, the spray gun setting may indicate an output rate of the spray gun that is based upon a temperature and humidity determination of how quickly the paint will dry as it is applied and whether the paint will run once it is applied. Further, the remote server 130 may be able to calculate a "pot life" for the coating mixture based upon the measured temperature and humidity.

In some examples, a particular coating location may comprise multiple different electronic coating composition networking devices 100. The electronic coating composition networking devices 100 may be spread throughout the location such that each device is gathering sensor variables from different positions. The remote server 130 may then average, such as the arithmetic mean, the received data to more accurately determine conditions around the coating mixture. Additionally, in some cases, the different electronic coating composition networking devices 100 may comprise different configurations, such that different electronic coating composition networking devices 100 comprise different sensors and different capabilities. For instance, an electronic coating composition networking device 100 may only function as a sensor such that it does not communicate with a scale or other device but instead only gathers sensor variables for the remote server.

Accordingly, disclosed systems and methods provide several significant benefits to the art relating to the dynamic mixing of coating compositions. For instance, disclosed embodiments provide sensors that are able to read environmental conditions relating to the paint mixing and/or application and provide specific measurements of constituent parts to create the target coating formulation.

Figure 5:
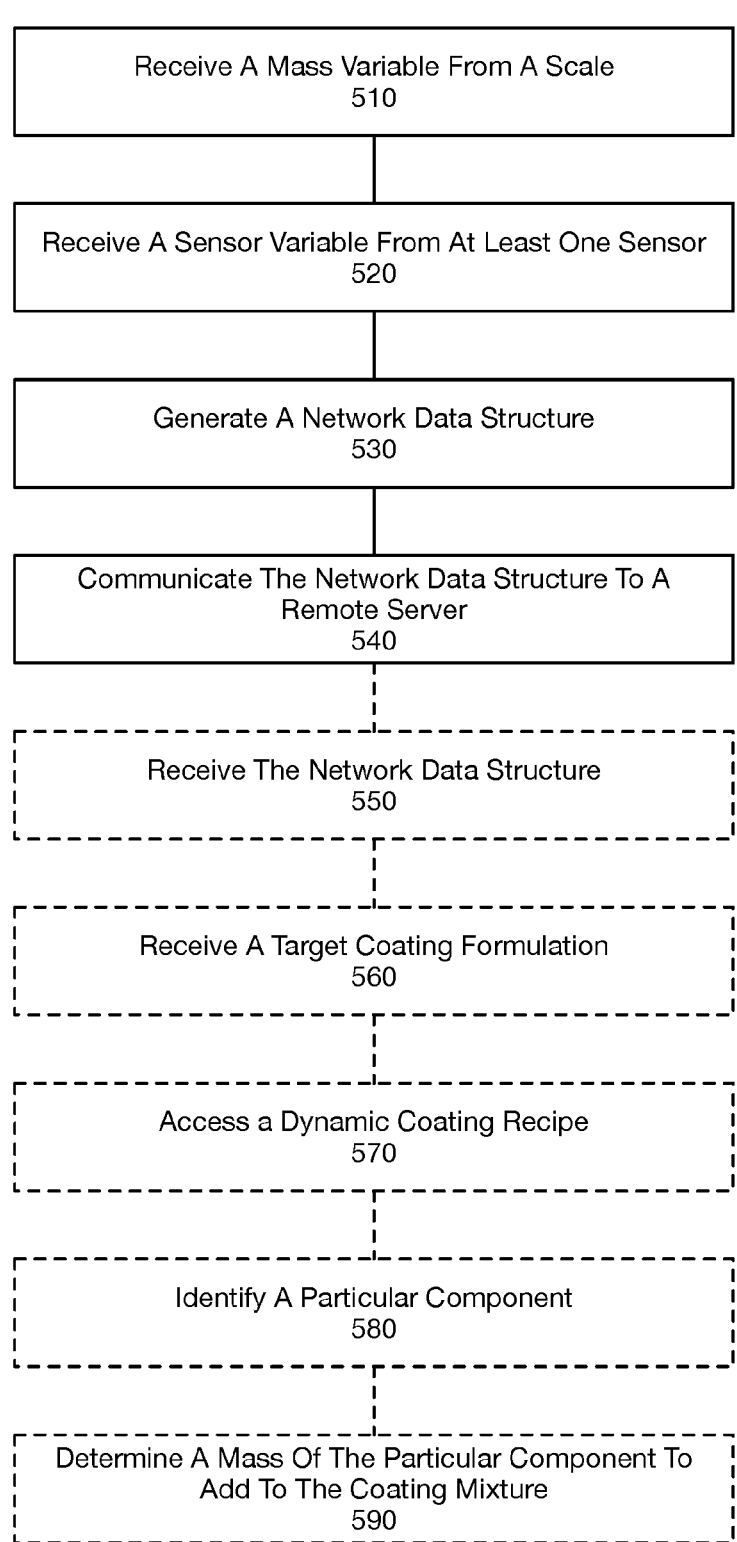
FIG. 5 depicts a flow chart of steps in a method for weighing and formulating coating compositions.

FIG. 5 depicts a flow chart of steps in a method 500 for weighing and formulating coating compositions. The method 500 includes an act 510 of receiving a mass variable from a scale. Act 510 comprises receiving at an electronic coating composition networking device, through a local communication interface, a mass variable from an electronic scale, wherein the mass variable provides a mass of a coating mixture resting on the electronic scale, and the local communication interface is configured to receive a physical connector from the electronic scale, wherein the electronic scale comprises a separate device that is external to a physical enclosure that encloses the electronic coating composition networking device. For example, as depicted in FIGS. 1-3, an electronic scale 110 communicates mass variables to the electronic coating composition networking device 100 through a physical connection, such as a USB port.

Method 500 also includes an act 520 of receiving a sensor variable from at least one sensor. Act 520 comprises receiving, from at least one sensor, a sensor variable, wherein the sensor variable provides data describing an aspect of a physical environment around the coating mixture, and the at least one sensor is integrated within the electronic coating composition networking device. For example, as depicted in FIGS. 1-3, the electronic coating composition networking device 100 comprises at least one sensor 108 that measures environmental data around the coating mixture 112.

Additionally, method 500 includes an act 530 of generating a network data structure. Act 530 comprises generating a network data structure comprising the sensor variable and the mass variable. For example, as depicted in FIG. 4, the electronic coating composition networking device 100 generates network data structure 440.

Method 500 additionally includes an act 540 of communicating the network data structure to a remote server 540. Act 540 comprises communicating from the electronic coating composition networking device, through an internet gateway, the network data structure, to a remote server. For example, as depicted in FIG. 4, the electronic coating composition networking device 100 communicates the network data structure 440 to the remote server 130.

Method 500 may also optionally include acts 550, 560, 570, 580, and 590. Additionally or alternatively, acts 550, 560, 570, 580, and 590 may comprise a separate and independent method. For example, method 500 may include an act 550 of receiving the network data structure. Act 550 comprises receiving, at the remote server, the network data structure from the electronic coating composition networking device. For example, as depicted in FIG. 4, the remote server 130 receives the network data structure 440 from the electronic coating composition networking device 100.

Additionally, method 500 may include an act 560 of receiving a target coating formulation 560. Act 560 may comprise receiving, at the remote server, an indication of a target coating formulation, wherein the coating mixture comprises at least one component of the target coating formulation. For example, as depicted in FIGS. 1-4, the remote computing device 140 may communicate to the remote server 130 a target coating formulation.

Method 500 may additionally include an act 570 of accessing a dynamic coating recipe. Act 570 comprises accessing, from a coating database, a dynamic coating recipe, wherein the dynamic coating recipe considers the mass of constituent components of the target coating formulation as a function of the data provided by the sensor variable. For example, as depicted in FIG. 4, the dynamic coating recipe module 420 accesses a coating database stored within the computer-readable media 426. The coating database comprises dynamic recipes for various coatings. Those recipes may include algorithms and/or lookup tables to adjust the constituent components of the target coating formulation based upon various environmental factors.

Further, method 500 may include an act 580 of identifying a particular component. Act 580 comprises identifying a particular component, selected from the constituent components, to add to the coating mixture. For example, as depicted and described with respect to FIG. 4, the dynamic coating recipe module 420 determines a particular component to add to the coating mixture 112 based upon the sensor variable and/or mass variable. As described above, in some cases, environmental conditions may cause the dynamic coating recipe module 420 to include or remove various components from a coating mixture.

Further still, method 500 may include an act 590 of determining a mass of the particular component to add to the coating mixture. Act 590 comprises determining a particular mass of the particular component to add to the coating mixture based upon the mass variable and the sensor variable, wherein the aspect of a physical environment around the coating mixture determines, at least in part, the particular mass. For example, as depicted and described with respect to FIG. 4, the dynamic coating recipe module 420 determines a particular mass of a constituent component to add to the coating mixture 112 based upon the sensor variable and mass variable.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention is further specified in the following clauses.

Clause 1: A coating composition system for weighing and formulating coating compositions, as in particular performing the method according to any of clauses 15 to 20, the coating composition system comprising:

a physical enclosure enclosing an electronic coating composition networking device, wherein the electronic coating composition networking device comprises a local communication interface, a network communication interface, at least one sensor, one or more processors and a first computer-readable media; wherein the local communication interface is configured to receive a physical connector from an electronic scale, wherein the electronic scale comprises a separate device that is external to the physical enclosure;

the network communication interface is configured to communicate with an internet gateway;

the at least one sensor, such as a temperature sensor and/or a humidity sensor, is integrated within the electronic coating composition networking device;

the one or more processors is configured to process data received from the electronic scale and the at least one sensor; and the first computer-readable media has stored thereon executable instructions that when executed by the one or more processors configure the electronic coating composition networking device to perform at least the following:

receive, through the local communication interface, a mass variable from the electronic scale, wherein the mass variable provides a mass of a coating mixture resting on the electronic scale;

receive from the at least one sensor a sensor variable, wherein the sensor variable provides data describing an aspect of a physical environment around the coating mixture;

generate, using the one or more processors, a network data structure comprising the sensor variable and the mass variable; and communicate, through the internet gateway, the network data structure to a remote server.

Clause 2: The coating composition system as recited in clause 1, further comprising:

a remote server, in communication with the electronic coating composition networking device, the remote server being physically separate from the electronic coating composition networking device and a computing device; wherein the remote server comprises a second computer-readable media having stored thereon executable instructions that when executed by the remote server configure the remote server to perform at least the following:

receive the network data structure from the electronic coating composition networking device;

receive an indication of a target coating formulation, wherein the coating mixture comprises at least one component of the target coating formulation;

access, from a coating database, a dynamic coating recipe, wherein the dynamic coating recipe considers the mass of constituent components of the target coating formulation as a function of the data provided by the sensor variable;

identify a particular component, selected from the constituent components, to add to the coating mixture based upon the mass variable and/or the sensor variable; and determine a particular mass of the particular component to add to the coating mixture based upon the mass variable and the sensor variable, wherein the aspect of a physical environment around the coating mixture determines, at least in part, the particular mass.

Clause 3: The coating composition system as recited in any of clauses 1 or 2, wherein the electronic coating composition networking device comprises a location-detection antenna that is configured to detect a geographic location of the electronic coating composition networking device.

Clause 4: The coating composition system as recited in any of clauses 1 to 3, wherein the network data structure further comprises the geographic location of the electronic coating composition networking device.

Clause 5: The coating composition system as recited in any of clauses 2 to 4, wherein the second computer-readable media further comprises executable instructions that when executed configure the remote server to perform at least the following:

determine the particular mass of the particular component to add to the coating mixture based upon the mass variable, the sensor variable, and the geographic location.

Clause 6: The coating composition system as recited in any of clauses 1 to 5, wherein the first computer-readable media having stored thereon further executable instructions that when executed by the electronic coating composition networking device configure the remote server to perform at least the following:

receive, through the local communication interface, an updated mass variable from the electronic scale, wherein the updated mass variable provides an updated mass of the coating mixture resting on the electronic scale, the updated mass comprising the at least one component of the target coating formulation and the particular component;

generate an updated network data structure comprising the updated mass variable; and communicate, through the internet gateway, the updated network data structure, wherein the updated network data structure is addressed to the remote server.

Clause 7: The coating composition system as recited in clause 6, further comprising:

the second computer-readable media having stored thereon executable instructions that when executed by the one or more processors configure the remote server to perform at least the following:

receive the updated network data structure from the electronic coating composition networking device; and verify the updated mass variable is equal to a sum of the particular mass and the mass variable.

Clause 8: The coating composition system as recited in any of clauses 1 to 7, wherein the at least one sensor comprises one or more of a humidity sensor, a temperature sensor, or a pressure sensor.

Clause 9: The coating composition system as recited in any of clauses 1 to 8, wherein the electronic scale comprises an analog scale.

Clause 10: The coating composition system as recited in any of clauses 1 to 9, wherein the electronic scale lacks a hardware network interface.

Clause 11: The coating composition system as recited in any of clauses 1 to 10, wherein the electronic scale communicates with the remote server only through the electronic coating composition networking device.

Clause 12: The coating composition system as recited in any of clauses 1 to 11, wherein the at least one sensor comprises an interchangeable hardware slot that is configured to receive a plurality of different sensor types.

Clause 13: The coating composition system as recited in any of clauses 1 to 12, further comprising:

the computing device, in communication with the electronic coating composition networking device, the computing device being physically separate from the electronic coating composition networking device; wherein the computing device comprises a third computer-readable media having stored thereon executable instructions that when executed by the computing device configure the computing device to perform at least the following:

receive the network data structure from the electronic coating composition networking device;

receive an indication of a target coating formulation, wherein the coating mixture comprises at least one component of the target coating formulation;

access, from a coating database, a dynamic coating recipe, wherein the dynamic coating recipe considers the mass of constituent components of the target coating formulation as a function of the data provided by the sensor variable;

identify a particular component, selected from the constituent components, to add to the coating mixture based upon the mass variable and/or the sensor variable; and determine a particular mass of the particular component to add to the coating mixture based upon the mass variable and the sensor variable, wherein the aspect of a physical environment around the coating mixture determines, at least in part, the particular mass.

Clause 14: The coating composition system as recited in any of clauses 1 to 13, wherein the sensor variable comprises a temperature, a humidity level, an atmospheric pressure, an altitude and/or a geographic location, preferably a temperature and a humidity level.

Clause 15: A method for weighing and formulating coating compositions, the method executed on one or more processors, particularly the method can be executed on a system as defined in clauses 1 to 14, the method comprising:

receiving at an electronic coating composition networking device, through a local communication interface, a mass variable from an electronic scale, wherein:

the mass variable provides a mass of a coating mixture resting on the electronic scale, and the local communication interface is configured to receive a physical connector from the electronic scale, wherein the electronic scale comprises a separate device that is external to a physical enclosure that encloses the electronic coating composition networking device;

receiving, from at least one sensor, a sensor variable, wherein:

the sensor variable provides data describing an aspect of a physical environment around the coating mixture, and the at least one sensor is integrated within the electronic coating composition networking device;

generating, using the one or more processors, a network data structure comprising the sensor variable and the mass variable; and communicating from the electronic coating composition networking device, through an internet gateway, the network data structure, to a remote server.

Clause 16: The method as recited in clause 15, further comprising:

receiving, at the remote server, the network data structure from the electronic coating composition networking device;

receiving, at the remote server, an indication of a target coating formulation, wherein the coating mixture comprises at least one component of the target coating formulation;

accessing, from a coating database, a dynamic coating recipe, wherein the dynamic coating recipe considers the mass of constituent components of the target coating formulation as a function of the data provided by the sensor variable;

identifying a particular component, selected from the constituent components, to add to the coating mixture based upon the mass variable and/or the sensor variable; and determining a particular mass of the particular component to add to the coating mixture based upon the mass variable and the sensor variable, wherein the aspect of a physical environment around the coating mixture determines, at least in part, the particular mass.

Clause 17: The method as recited in clauses 15 or 16, wherein the sensor variable comprises:

a humidity reading from the physical environment around the coating mixture; and a temperature reading from the physical environment around the coating mixture.

Clause 18: The method as recited in any of clauses 15 to 17, further comprising:

identifying that the sensor variable comprises data that is outside of a predetermined threshold for a particular constituent component of the target coating formulation; and communicate a command that causes a computing device to display a warning relating to the predetermined threshold for the particular constituent component of the target coating formulation.

Clause 19: The method as recited in any of clauses 15 to 18, further comprising: based upon the sensor variable and the coating composition, determining a spray gun setting.

Clause 20: The method as recited in any of clauses 15 to 19: further comprising: Receive, at the remote server, from a second electronic coating composition networking device a second variable description describing an aspect of a different physical environment around the coating mixture and wherein the identification of the particular component and/or the determination of the particular mass of the particular component is additionally based on the second variable description.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A coating composition system for weighing and formulating coating compositions, the coating composition system comprising:

a physical enclosure enclosing an electronic coating composition networking device, wherein the electronic coating composition networking device comprises a local communication interface, a network communication interface, at least one sensor, one or more processors and a first computer-readable media;

the local communication interface being configured to receive a physical connector from an electronic scale, wherein the electronic scale comprises a separate device that is external to the physical enclosure and the electronic scale lacks a network communication interface, the local communication interface within the physical enclosure thereby enabling the electronic scale to provide mass data to a remote server, the network communication interface being configured to communicate with an internet gateway, the at least one sensor being integrated within the electronic coating composition networking device, the one or more processors being configured to process data received from the electronic scale and the at least one sensor, and the first computer-readable media has stored thereon executable instructions that when executed by the one or more processors configure the electronic coating composition networking device to perform at least the following:

receive, through the local communication interface, a mass variable from the electronic scale, wherein the mass variable provides a mass of a coating mixture resting on the electronic scale;

receive from the at least one sensor a sensor variable, wherein the sensor variable provides data describing an aspect of a physical environment around the coating mixture, the aspect of the physical environment including one or more of a temperature, a humidity, a pressure, or a dew point;

generate, using the one or more processors, a network data structure comprising the sensor variable and the mass variable;

communicate, through the internet gateway, the network data structure to a remote server; and receive from the remote server a selected formulation from a plurality of different target coating formulations, the selected formulation chosen based at least in part on the sensor variable describing the aspect of the physical environment around the coating mixture in combination with the mass variable from the electronic scale, wherein the selected formulation comprises both components that should be added to the coating mixture and masses for each of the components.

2. The coating composition system as recited in claim 1, further comprising:

the remote server, in communication with the electronic coating composition networking device, the remote server being physically separate from the electronic coating composition networking device and a computing device;

wherein the remote server comprises a second computer-readable media having stored thereon executable instructions that when executed by the remote server configure the remote server to perform at least the following:

receive the network data structure from the electronic coating composition networking device;

receive an indication of a target coating formulation, wherein the coating mixture comprises at least one component of the target coating formulation;

access, from a coating database, a dynamic coating recipe, wherein the dynamic coating recipe considers the mass of constituent components of the target coating formulation as a function of the data provided by the sensor variable;

identify a particular component, selected from the constituent components, to add to the coating mixture; and determine a particular mass of the particular component to add to the coating mixture based upon the mass variable and the sensor variable, wherein the aspect of a physical environment around the coating mixture determines, at least in part, the particular mass.

3. The coating composition system as recited in claim 2, wherein the electronic coating composition networking device comprises a location-detection antenna that is configured to detect a geographic location of the electronic coating composition networking device.

4. The coating composition system as recited in claim 3, wherein the network data structure further comprises the geographic location of the electronic coating composition networking device.

5. The coating composition system as recited in claim 4, wherein the second computer-readable media further comprises executable instructions that when executed configure the remote server to perform at least the following:

determine the particular mass of the particular component to add to the coating mixture based upon the mass variable, the sensor variable, and the geographic location.

6. The coating composition system as recited in claim 2, wherein the first computer-readable media having stored thereon further executable instructions that when executed by the electronic coating composition networking device configure the remote server to perform at least the following:

receive, through the local communication interface, an updated mass variable from the electronic scale, wherein the updated mass variable provides an updated mass of the coating mixture resting on the electronic scale, the updated mass comprising the at least one component of the target coating formulation and the particular component;

generate an updated network data structure comprising the updated mass variable; and communicate, through the internet gateway, the updated network data structure, wherein the updated network data structure is addressed to the remote server.

7. The coating composition system as recited in claim 6, further comprising:

the second computer-readable media having stored thereon executable instructions that when executed by the one or more processors configure the remote server to perform at least the following:

receive the updated network data structure from the electronic coating composition networking device; and verify the updated mass variable is equal to a sum of the particular mass and the mass variable.

8. The coating composition system as recited in claim 1, wherein the at least one sensor comprises one or more of a humidity sensor, a temperature sensor, or a pressure sensor.

9. The coating composition system as recited in claim 1, wherein the electronic scale comprises an analog scale.

10. The coating composition system as recited in claim 1, wherein the electronic scale lacks a hardware network interface.

11. The coating composition system as recited in claim 10, wherein the electronic scale communicates with the remote server only through the electronic coating composition networking device.

12. The coating composition system as recited in claim 1, wherein the at least one sensor comprises an interchangeable hardware slot that is configured to receive a plurality of different sensor types.

13. The coating composition system as recited in claim 1, further comprising:

a computing device, in communication with the electronic coating composition networking device, the computing device being physically separate from the electronic coating composition networking device;

wherein the computing device comprises a third computer-readable media having stored thereon executable instructions that when executed by the computing device configure the computing device to perform at least the following:

receive the network data structure from the electronic coating composition networking device;

receive an indication of a target coating formulation, wherein the coating mixture comprises at least one component of the target coating formulation;

access, from a coating database, a dynamic coating recipe, wherein the dynamic coating recipe considers the mass of constituent components of the target coating formulation as a function of the data provided by the sensor variable;

identify a particular component, selected from the constituent components, to add to the coating mixture; and determine a particular mass of the particular component to add to the coating mixture based upon the mass variable and the sensor variable, wherein the aspect of a physical environment around the coating mixture determines, at least in part, the particular mass.

14. A method for weighing and formulating coating compositions, the method executed on one or more processors, the method comprising:

receiving at an electronic coating composition networking device, through a local communication interface, a mass variable from an electronic scale, wherein:

the mass variable provides a mass of a coating mixture resting on the electronic scale, and the local communication interface is configured to receive a physical connector from the electronic scale, wherein the electronic scale comprises a separate device that is external to a physical enclosure that encloses the electronic coating composition networking device and the electronic scale lacks a network communication interface, the local communication interface within the physical enclosure thereby enabling the electronic scale to provide mass data to a remote server;

receiving, from at least one sensor, a sensor variable, wherein:

the sensor variable provides data describing an aspect of a physical environment around the coating mixture, the aspect of the physical environment including one or more of a temperature, a humidity, a pressure, or a dew point, and the at least one sensor is integrated within the electronic coating composition networking device;

generating, using the one or more processors, a network data structure comprising the sensor variable and the mass variable;

communicating the network data structure from the electronic coating composition networking device to the remote server; and receiving, from the remote server, a selected target coating formulation based at least in part on the sensor variable from the remote server at the electronic coating composition networking device in combination with the mass variable from the electronic scale, wherein the selected target coating formulation comprises both components that should be added to the coating mixture and masses for each of the components.

15. The method as recited in claim 14, further comprising:

receiving, at the remote server, the network data structure from the electronic coating composition networking device;

receiving, at the remote server, an indication of a target coating formulation, wherein the coating mixture comprises at least one component of the target coating formulation;

accessing, from a coating database, a dynamic coating recipe, wherein the dynamic coating recipe considers the mass of constituent components of the target coating formulation as a function of the data provided by the sensor variable;

identifying a particular component, selected from the constituent components, to add to the coating mixture; and determining a particular mass of the particular component to add to the coating mixture based upon the mass variable and the sensor variable, wherein the aspect of a physical environment around the coating mixture determines, at least in part, the particular mass.

16. The method as recited in claim 15, further comprising:

identifying that the sensor variable comprises data that is outside of a predetermined threshold for a particular constituent component of the target coating formulation; and communicate a command that causes a computing device to display a warning relating to the predetermined threshold for the particular constituent component of the target coating formulation.

17. The method as recited in claim 15, further comprising:

based upon the sensor variable and the target coating formulation, determining a spray gun setting.

18. The method as recited in claim 15, further comprising:

receive, at the remote server, from a second electronic coating composition networking device a second variable description describing an aspect of a different physical environment around the coating mixture and wherein the identification of the particular component and/or the determination of the particular mass of the particular component is additionally based on the second variable description.

* * * * *